United States Patent [19]

Abbey, III

[11] Patent Number: 4,600,180
[45] Date of Patent: Jul. 15, 1986

[54] SCARFING TOOL

[75] Inventor: Nelson D. Abbey, III, Toledo, Ohio

[73] Assignee: Abbey Etna Machine Company, Perrysburg, Ohio

[21] Appl. No.: 703,031

[22] Filed: Feb. 19, 1985

[51] Int. Cl.⁴ .............................................. B23K 7/04
[52] U.S. Cl. ......................................... 266/51; 266/55
[58] Field of Search .................................... 266/55, 51

[56] References Cited

U.S. PATENT DOCUMENTS 2,622,327 12/1952 Halonen ................................ 266/55
4,162,383 7/1979 Hamasaki ............................. 266/55
4,483,721 11/1984 Hearn .................................... 266/55

*Primary Examiner*—Wayland Stallard
*Attorney, Agent, or Firm*—Marshall & Melhorn

[57] ABSTRACT

An apparatus for internally removing a raised weld bead of a longitudinal seam welded tube having an elongate mandrel support body. A cutting tool is mounted on the support body adjacent one of its ends and projects outwardly from one surface on the body. A pivot roll and a stabilizing roll are mounted in the support body in spaced relation in the elongate direction of the body and project outwardly from the same surface as the cutting tool. A resiliently mounted carriage roll disposed between the pivot roll and the stabilizing roll which projects outwardly from the surface of the support body opposite the one surface. A tilting roll remotely disposed from the cutting tool and moveable in either vertical direction by cams to effect pivotal movement of the support body about the pivot roll, and advance and retract the cutting tool with respect to the internal weld bead.

7 Claims, 13 Drawing Figures

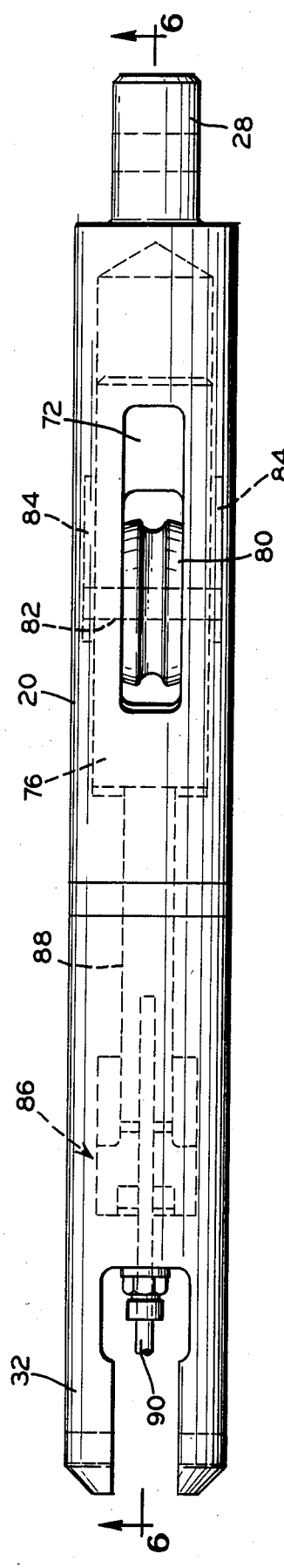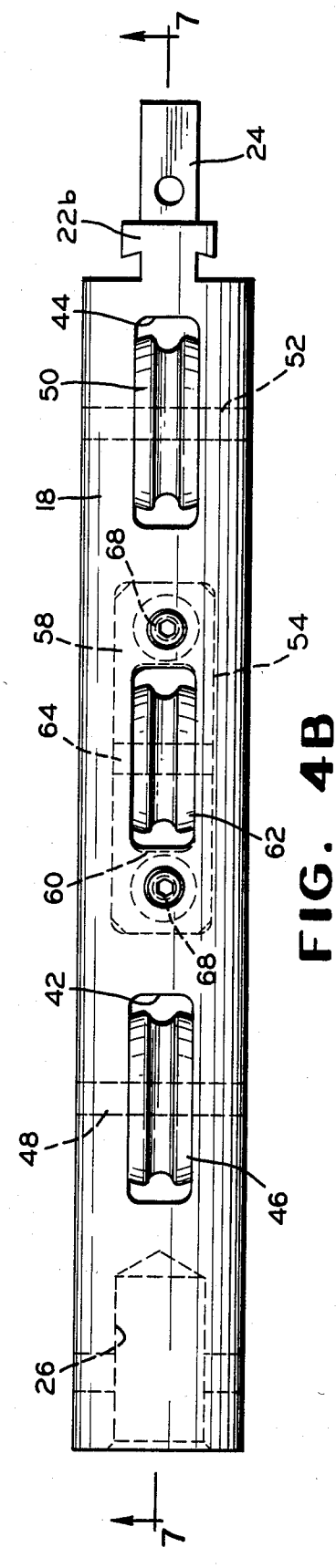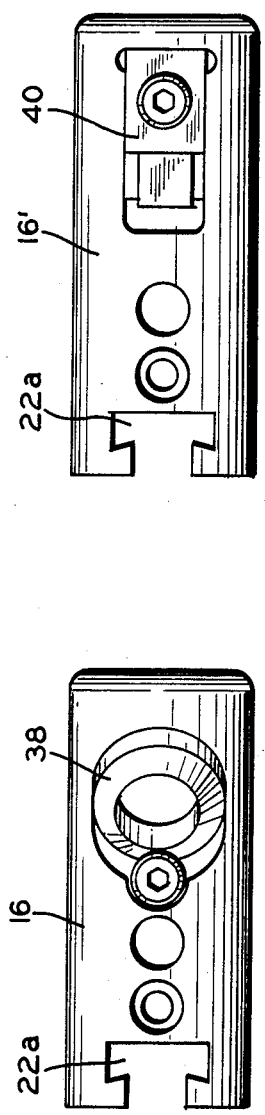

SCARFING TOOL

BACKGROUND OF THE INVENTION

The present invention relates generally to the manufacture of electric seam-welded, continuous metal tubes and pipes and, more particularly, to a novel apparatus for removing the welding bead or flash produced from the internal surface of the tubes and pipes.

A known process for manufacturing electric seam-welded tubes and pipes from a strip or skelp includes forming the strip or skelp into a tubular form having an open seam; heating the longitudinal edges to fusion temperature; and forcing the heated edges together to produce a continuous, monolithic weld of the seam. In the manufacturing process, a certain amount of the abutting edges of the strip are squeezed both outwardly and inwardly along the longitudinal weld seam of the tubes and pipes resulting in a raised bead or flash. In many cases, the welding bead or flash must be evenly and accurately removed flush with the internal and external surfaces of the tubes and pipes to produce a viable commercial product.

The removal of the welding bead from the outside surface of the tubes and pipes is relatively simple and may be performed by any one of a number of conventional processes. However, the removal of the welding bead produced on the inner surface of the tubes and pipes is more difficult and raises problems that are particularly serious in the high-speed continuous production of welded tubes and pipes where it is desirable to remove the weld flash, while the flash is hot, in the production line during the manufacture of the welded tubes and pipes.

Many devices have been proposed in the past for removing the internal weld bead of the tubes and pipes during manufacture. It is known to provide a cutting tool mounted on a support head assembly located firmly on wheels and attached to the end of a rod positioned in the interior bore of the tubes and pipes. However, none of the structures of the known devices have proven to be completely satisfactory in overcoming the pressure exerted on the cutting tool when the tool is in engagement with the inner surface of the tubes and pipes.

SUMMARY OF THE INVENTION

The present invention overcome the aforementioned problems by mounting a scarfing tool at the end of a mandrel and tilting the mandrel by fluid pressure to place the cutting tool in position to remove a raised weld bead from the inner surface of the tubes and pipes.

Generally, the mandrel structure of the present invention comprises a scarfing tool mounted at one end of an elongate mandrel body which is supported intermediate its ends by a pair of longitudinally spaced rolls which project outwardly from one surface of the mandrel body and a resiliently mounted roll which is disposed between the pair of fixed rolls and projects outwardly from the opposing surface of the mandrel body. A roll located upstream of the pair of fixed rolls and movably mounted in a longitudinally extending cam provided in the mandrel body tilts the mandrel body about the fixed roll located furthest from the scarfing tool to move the scarfing tool into position for removing the weld bead and retracted therefrom.

An object of the invention is to produce a scarfing tool structure wherein resilient pressure is exerted by the mandrel on the cutting tool to cause the cutting tool to be in intimate contact with the inner surface of the tubes and pipes to minimize tool chatter, produce a smooth cut surface, and maximize tool life.

BRIEF DESCRIPTION OF THE DRAWINGS

The above, as well as other objects and advantages of the invention, will become manifest to one skilled in the art from reading the following detailed description of a preferred embodiment of the invention when considered in light of the accompanying drawings, in which:

FIGS. 4A to 4D, inclusive, are plan views of the modular components employed in the scarfing tool structure;

DESCRIPTION OF THE PREFERRED EMBODIMENT

Figure 1:
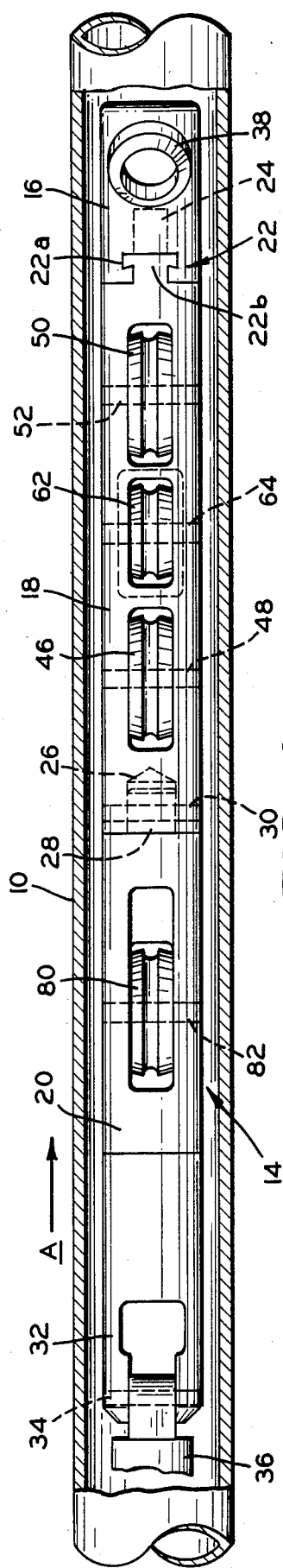
FIG. 1 is a schematic plan view of a scarfing tool structure embodying the invention.
Figure 2:
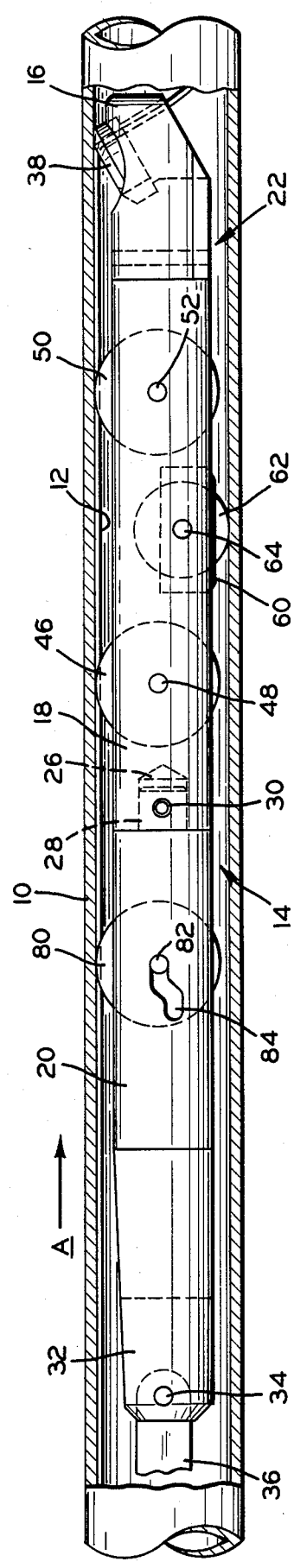
FIGS. 2 and 3 are schematic elevational views showing the scarfing and retracted positions of the scarfing tool structure illustrated in FIG. 1.
Figure 3:
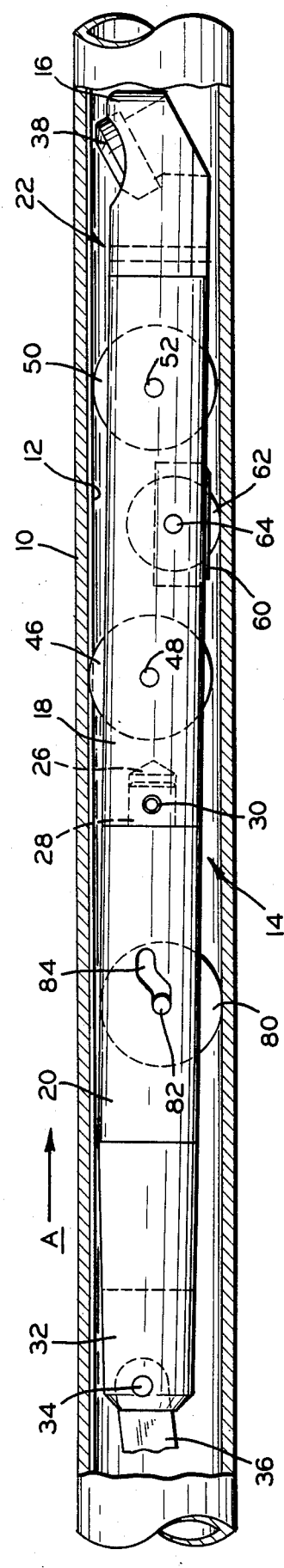

Referring particularly to FIGS. 1, 2 and 3 of the drawings, there is illustrated a section of cylindrical seam-welded metal tubing 10 which is continuously produced in a conventional tube forming mill. The tube 10 is illustrated as traveling the direction of arrow A and includes an internal weld bead 12.

In FIGS. 1 and 3, a scarfing tool mandrel assembly, designated in its entirety by the reference numeral 14, is disposed within the tube 10 and comprises a number of modular components; namely, a tool carrier body 16, an intermediate support body 18, and a cylinder assembly body 20. As best illustrated in FIG. 1, one end of the tool carrier body 16 is provided with the female portion 22a of a dove tail connection 22. The adjacent end of the intermediate body 18 is provided with the male portion 22b of the dove tail connection 22 as well as a support lug 24 which cooperates with a complementary surface 24a (FIGS. 5C and 5D) provided on the tool carrier body 16 for rigidly attaching the tool carrier body 16 to the adjacent end of the intermediate body 18.

The opposite end of the intermediate body 18 is provided with a counterbore 26 which is adapted to receive a projecting cylindrically shaped stub shaft 28 integrally formed on the adjacent end of the cylinder assembly body 20. A roll pin 30 inserted in the line aperture provided in the wall defining the counterbore 26 and the stub shaft 28 fixedly secures the end of the intermediate body 18 to the adjacent end of the cylinder body 20.

The other end of the cylinder assembly body 20 is provided with a clevis portion 32 having a pin 34 extending between the arms thereof. The pin 34 is adapted for attachment to an end 36 of a conventional fixture (not shown) which maintains the mandrel assembly 14 in a stationary position as the tube 10 is moved along a longitudinal path by the forming mill.

Figure 5A:
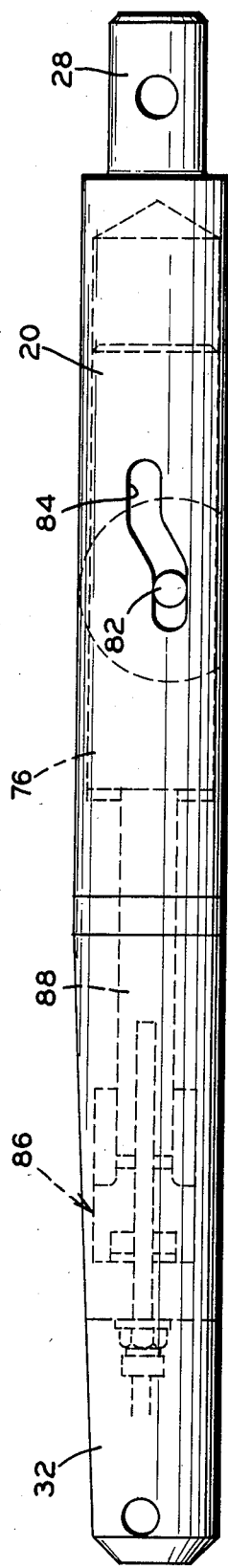
FIGS. 5A to 5D, inclusive, are elevational views of the modular components employed in the scarfing tool structure.
Figure 5B:
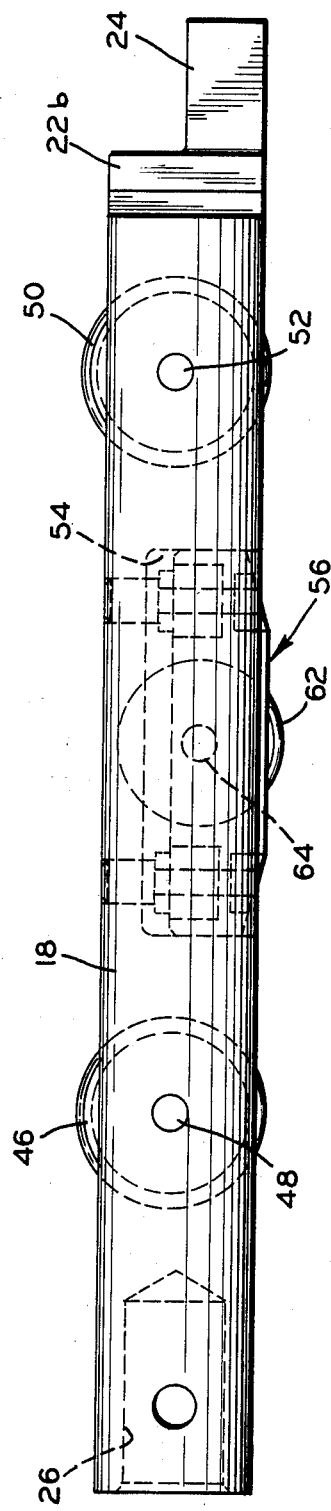
Figure 5D:
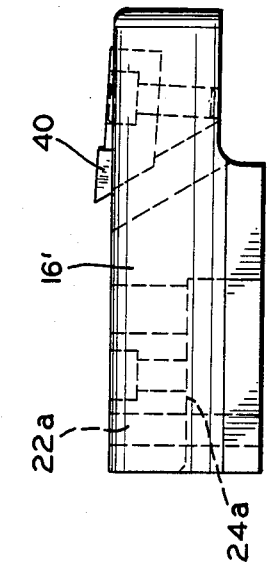
Figure 5C:
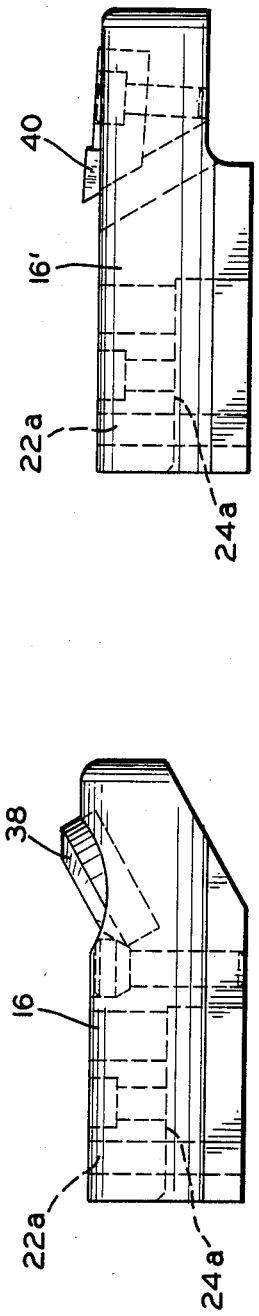

The tool carrier body 16 carries a ring cutting tool 38 as illustrated in FIGS. 4C and 5C or a modified tool carrier body 16' as illustrated in FIGS. 4D and 5D carries a conventional cutting tool 40.

Figure 7:
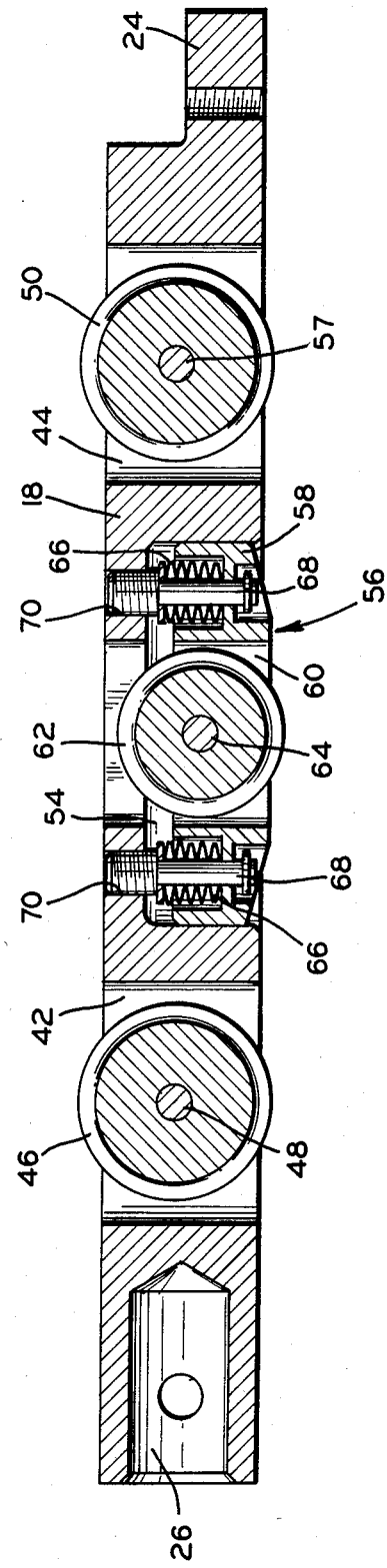
FIG. 7 is a cross-sectional view taken substantially along line 7—7 of FIG. 4B.

Referring particularly to FIGS. 4B, 5B and 7, the intermediate support body 18 includes a pair of longitudinally spaced, aligned vertical slots 42 and 44 with the slot 44 adjacent the dove tail connection 22 and the slot 42 remote therefrom. A grooved roll 46 is rotatably journeled on a transversely extending shaft 48 positioned within the slot 42 so that a major portion of the roll 46 extends beyond the outer surface of the support body 18. The roll 46 is adapted to function as a pivot roll as will be described hereinafter. A grooved roll 50 of a size similar to roll 46 is rotatably journaled on a transversely extending shaft 52 positioned within the slot 44 and in horizontal alignment with the shaft 48 so that a like portion of the grooved roll 50 extends above the outer surface of the support body 18. The roll 50 is adapted to function as a stabilizing roll as will be described in detail hereinafter.

Still referring to FIGS. 4B, 5B and 7, the intermediate body 18 includes an elongated longitudinal vertical opening 54 disposed between and aligned with the vertical slots 42 and 44 for receiving a carriage roll assembly 56. As best illustrated in FIG. 7, the carriage roll assembly 56 comprises an elongated body 58 having a vertical slot 60 for receiving a grooved roll 62 journaled on a transversely extending shaft 64. The shaft 64 is positioned in the slot 60 so that a major portion of the roll 62 extends beyond the outer surface of the body 58. Still referring to FIG. 7, it should be noted that the body 58 is resiliently mounted in the opening 54 by means of bellville spring washers 66 mounted on a pin 68 threadably secured as at 70 to the intermediate body 18 with the grooved roll 62 extending in a diametrically opposed direction with respect to the rolls 46 and 50. The spring washer 66 urges the roll 62 against one surface of the inner wall and functions to urge the rolls 46 and 50 against the diametrically opposed inner wall surface of the tube 10.

Figure 6:
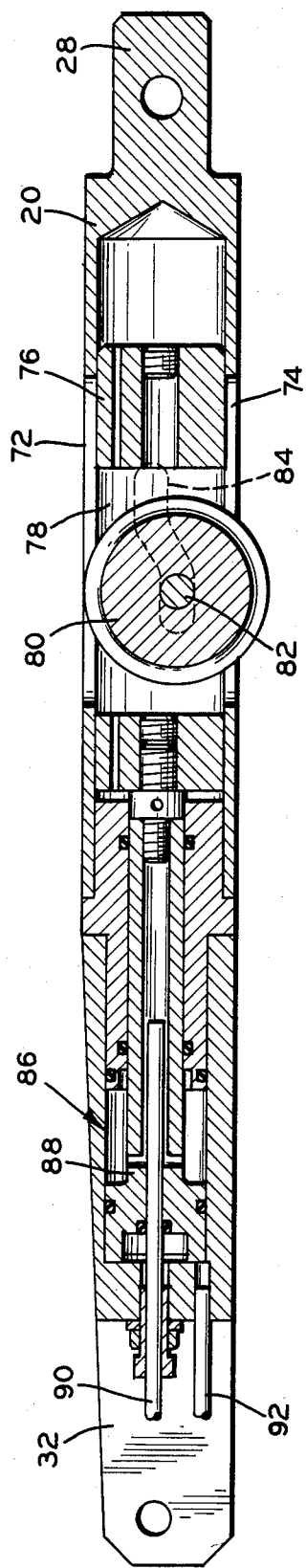
FIG. 6 is a cross-sectional view taken substantially along line 6—6 of FIG. 4A.

Referring particularly to FIGS. 4A, 5A and 6, the cylinder assembly body 20 is substantially tubular and includes a pair of diametrically opposed vertically aligned slots 72 and 74 (see FIG. 6) disposed intermediate the ends of the body 20 and longitudinally aligned with the slots 42 and 44 located in the intermediate support body 18. An elongate body 76 is longitudinally slidably mounted within the tubular portion of the body 20. The body 76 includes a vertical slot 78 longitudinally aligned with the slots 72 and 74. A grooved roll 80 is rotatably journaled on a transfer shaft 82 the ends of which shaft extend beyond the walls of the body 76 defining the slot 78. The opposed ends of the shaft 82 are slidably mounted in longitudinally extending cam grooves 84 which are oriented so as to move the roll 80 in either vertical direction when the body 76 is moved in either longitudinal direction. Longitudinal movement of the body 76 is effected by a double-acting fluid pressure cylinder 86 disposed within the cylinder assembly body 20 with its piston rod 88 connected to one end of the body 76 by any suitable means. The fluid pressure cylinder 86 is provided with suitable supply and exhaust lines 90 and 92 (see FIG. 6) which are alternately controlled by appropriate valves (not shown) from a remote station.

In operation, the seam welded tube 10 is formed from flat metal strip or skelp by rolls in the forming section of a conventional tube forming mill and exits therefrom with an open seam. The open seam allows a mandrel holding fixture (not shown) to be inserted within the tube 10 beyond the seam closing and welding operations. Referring to FIGS. 1, 2 and 3, the mandrel assembly 14 is held in longitudinally stationary position by attaching the clevis portion 32 of the cylinder assembly body to the end 36 of a suitable holding fixture by a pin 34 which permits pivotal movement between the mandrel assembly 14 and the end 36 of the holding fixture.

Referring now to FIG. 2, the mandrel assembly 14 is shown in the weld bead scarfing position. The scarfing position of the tool 38 is effected by pressurizing one side of the power cylinder 86 to move the ends of the shaft 82 in a direction downstream from the pin 34 and longitudinally along the cam grooves 84 which causes the roll 80 to move vertically with respect to the body 20 and towards the weld bead 12. The vertical movement of the roll 80 causes the body of the mandrel assembly 14 to pivot about the roll 46 thus tilting the tool 38 to a position to bear against the inner surface of the tube 10 and remove the bead 12. It should be noted that the stabilizing roll 50 prevents excessive pressure from being applied to the scarfing tool 38 by the body of the mandrel assembly 14.

Referring now to FIG. 3, the mandrel assembly 14 is shown in a retracted position wherein the tool 38 is disengaged from the inner surface of the tube 10. The retracted position of the tool 38 is effected by pressurizing the side of the power cylinder 86 to move the ends of the shaft 82 in the direction upstream towards the pin 84 and longitudinally along the cam grooves 84 which causes the roll 80 to move vertically downwardly with respect to the body 20 and away from the weld bead 12. The downward vertical movement of the roll 80 causes the body of the mandrel assembly 14 to pivot about the pivot roll 80 thus tilting the tool 38 away from the inner surface of the tube 10.

It has been found that the above described structure results in a scarfing tool which exhibits a longer duty cycle than other known structures; effectively minimizes heretofore unwanted tool chatter; and satisfactorily removes the internal weld bead leaving a smooth uninterrupted internal pipe surface.

In accordance with the provisions of the patent statutes, the principal and mode of operation of the invention have been explained and illustrated in its preferred embodiment. However, it is to be understood that the invention can be practiced otherwise than as specifically illustrated and described without departing from its spirit or scope.

What is claimed is:

1. An apparatus for removing an internal raised weld bead of a longitudinally seam welded tubular member, comprising:
   a. an elongate support body having first and second ends longitudinally spaced in a cutting direction, said support body having a first surface facing the raised bead of the weld seam and an oppositely facing second surface with said surfaces extending longitudinally between the ends of said support body;
   b. a cutting tool mounted at one end of said body and projecting outwardly from said first surface;
   c. pivot means mounted in said body intermediate of said first and second ends and projecting outwardly from said first surface;
   d. tilting means mounted in said body intermediate of said pivot means and said second end and remote from said cutting tool, said pivot means and said tilting means being longitudinally aligned with each other and with said cutting tool;

e. means for moving said pivot means between said first and said second surfaces of said elongate support body for permitting said support body to tilt about said pivot means;

f. means for actuating said moving means; and g. carriage means resiliently mounted in said body intermediate said cutting tool and said pivot means and projecting outwardly as said second surface whereby said pivot means constantly engages the inner surface of a tubular member and said tilting means causes said cutting tool mounted at one end of said support body to move toward and away from the internal raised weld bead of the tubular member.

2. The invention defined in claim 1 wherein said means for moving said tilting means between said first and said second surfaces comprises cam means.

3. The invention defined in claim 1 wherein said pivot means, said tilt means and said carriage means comprises rolls.

4. The invention defined in claim 1 wherein said means for actuating said moving means comprises a fluid pressure cylinder.

5. The invention defined in claim 1 including stabilizing means disposed intermediate said cutting and said carriage means and projecting outwardly from said first surface.

6. The invention defined in claim 5 wherein said stabilizing means comprises a roll.

7. The invention defined in claim 1 wherein said elongate support body comprises at least three modular sections rigidly interconnected together.

* * * * *